(12) United States Patent
Sanchez et al.

(10) Patent No.: US 6,364,120 B1
(45) Date of Patent: Apr. 2, 2002

(54) FILTER TUB ASSEMBLY FOR DEEP FRYER

(75) Inventors: Rosendo A. Sanchez; Albert C. McNamara, both of San Antonio; Jack E. Garner, Stockdale; Allen F. Clark, San Antonio, all of TX (US)

(73) Assignee: Ultrafryer Systems, Inc., San Antonio, TX (US)

( * ) Notice: Subject to any disclaimer, the term of this patent is extended or adjusted under 35 U.S.C. 154(b) by 0 days.

(21) Appl. No.: 09/425,386

(22) Filed: Oct. 22, 1999

(51) Int. Cl.[7] .............................................. B01D 29/56
(52) U.S. Cl. ...................... 210/435; 210/167; 210/252; 210/256; 210/314; 210/315; 210/337; 210/489; 210/DIG. 8
(58) Field of Search .................... 210/435, 167–168, 210/534, DIG. 8, 252, 255, 256, 335–337, 489, 455, 314–315; 99/403, 405, 355, 415, 418

(56) References Cited

U.S. PATENT DOCUMENTS

| | | | | |
|---|---|---|---|---|
| 1,998,797 A | * | 4/1935 | Weinberger | 210/474 |
| 3,355,026 A | * | 11/1967 | Schut | |
| 3,937,136 A | * | 2/1976 | Cox | 99/408 |
| 4,324,173 A | * | 4/1982 | Moore et al. | |
| 4,444,095 A | * | 4/1984 | Anetsberger et al. | 99/408 |
| 4,702,827 A | * | 10/1987 | Wenzel | 210/117 |
| 4,945,893 A | * | 8/1990 | Manchester | |
| 5,247,876 A | * | 9/1993 | Wilson et al. | 99/408 |
| 5,404,799 A | * | 4/1995 | Bivens | 99/408 |
| 5,582,093 A | | 12/1996 | Amitrano et al. | 99/408 |
| 5,597,601 A | * | 1/1997 | Griffin | |
| 5,776,530 A | | 7/1998 | Davis et al. | 426/233 |
| 5,823,097 A | * | 10/1998 | Dirck | 99/408 |
| 5,870,945 A | | 2/1999 | Bivens | 99/408 |

FOREIGN PATENT DOCUMENTS

| | | | | |
|---|---|---|---|---|
| DE | 3542909 A | * | 6/1987 | |
| EP | 0037562 A | * | 10/1981 | |

OTHER PUBLICATIONS

"Special Report," *Foodservice Equipment Reports*, 3(9):43–54 (1999).

* cited by examiner

*Primary Examiner*—Matthew O. Savage
*Assistant Examiner*—Marianne Ocampo
(74) *Attorney, Agent, or Firm*—Banner & Witcoff, Ltd.

(57) ABSTRACT

A fryer system has a tub and a filter screen assembly located in the tub to filter cooking fluid. A filter pan or crumb catcher having a perforated surface is positioned above the tub to receive cooking fluid from a cooking vat of the fryer system. A pan is positioned between the filter pan or crumb catcher and the tub to receive cooking fluid and direct it to the tub, with the pan extending beyond outer edges of the filter screen assembly to substantially prevent the flow of cooking fluid from the filter pan or crumb catcher directly onto the filter screen assembly.

19 Claims, 2 Drawing Sheets

FILTER TUB ASSEMBLY FOR DEEP FRYER

INTRODUCTION

The present invention relates to a filter tub for a deep fryer, and more particularly, to a filter tub having improved filtering capabilities.

BACKGROUND

Deep fryers are commercially used by restaurants, institutional kitchens, and fast food establishments for cooking a variety of food products, such as french fries, fish, fried chicken, and the like. The food product is cooked by totally immersing it within a vat or tank that is filled with heated oil or shortening. The oil may be heated using a flow of heated gas that is forced or drawn through heat exchanger tubes located within the cooking vat. A filter tub is positioned beneath the vat and is used to catch shortening when it is drained from the vat. A screen is seated in the filter tub and shortening is drawn through the screen to filter the shortening. A cake of filter powder forms on the screen and provides additional filtering capability. A problem arises when shortening and sludge fall directly onto the cake of filter powder, disrupting the uniformity of the cake and, therefore, its filtering effect. Perforated pans, or crumb catchers, located above the screen have been used to address this problem. However, the perforated crumb catchers allow sludge-rich shortening to fall through directly onto the screen, disrupting the cake on the screen.

It is an object of the present invention to provide a filter tub for a deep fryer which reduces or wholly overcomes some or all of the aforesaid difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a filter tub for a deep fryer having improved filtering characteristics.

In accordance with a first aspect, a filter for a fryer system has a tub and a filter screen assembly positioned in the tub. A pan is positioned in the tub above the filter screen assembly. The pan extends beyond outer edges of the filter screen to substantially prevent the flow of a cooking fluid from the pan directly onto the filter screen assembly.

In accordance with another aspect, a filter for a fryer system has a tub and a filter screen assembly positioned in the tub. A pan is positioned in the tub above the filter screen, and the pan extends beyond outer edges of the filter screen. The pan has a bottom which slopes downwardly from a front wall to a back wall thereof and a plurality of apertures in the bottom proximate the back wall. A filter pan has perforations on a lower surface thereof sized to filter particles of a selected size, the filter pan being supported in the tub above the pan. A screen is positioned in the pan beneath the filter pan.

In accordance with yet another aspect, a filter for a fryer which is to be positioned above a filter screen in the fryer includes a pan having a front wall, a back wall, a pair of side walls, and a bottom. The bottom slopes downwardly from the front wall to the back wall. A plurality of apertures are formed in the bottom, and the apertures are oriented such that cooking fluid flowing through the apertures falls on the tub at a location beyond outer edges of the filter screen.

From the foregoing disclosure, it will be readily apparent to those skilled in the art, that is, those who are knowledgeable or experienced in this area of technology, that the present invention provides a significant technological advance. Preferred embodiments of the invention can provide improved filtering for the cooking fluid in a deep fryer. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
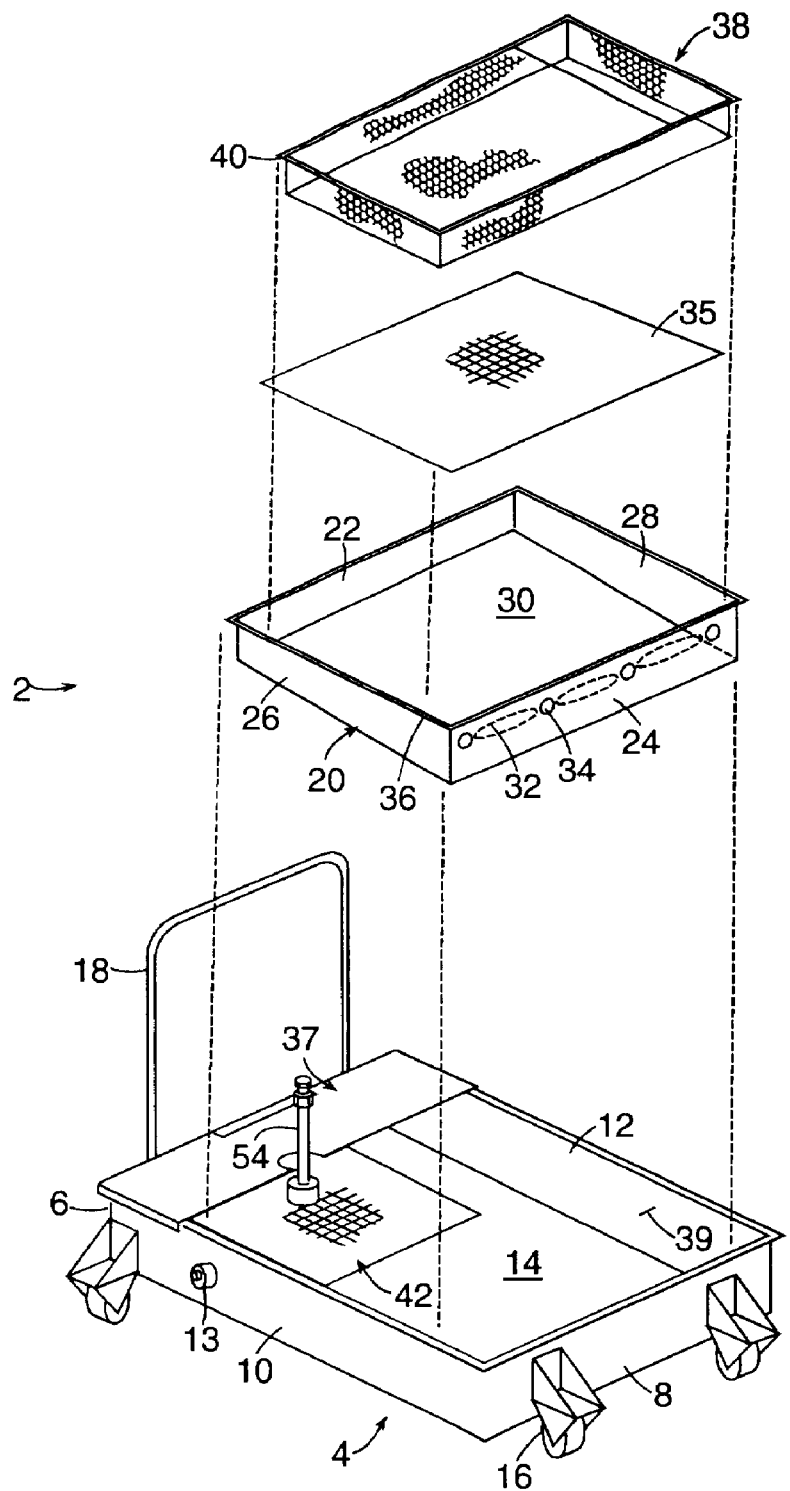
FIG. 1 is a schematic perspective view, shown in exploded form, of a filter tub assembly according to the present invention.

The figures referred to above are not drawn necessarily to scale and should be understood to present a representation of the invention, illustrative of the principles involved. Some features of the filter tub assembly depicted in the drawings have been enlarged or distorted relative to others to facilitate explanation and understanding. Filter tub assemblies, as disclosed herein, will have configurations and components determined, in part, by the intended application and environment in which they are used.

DETAILED DESCRIPTION OF CERTAIN PREFERRED EMBODIMENTS

Referring to FIG. 1, a filter tub assembly according to the present invention is shown generally by reference numeral 2. Filter tub assembly 2 is typically located beneath a vat in a deep fryer (not shown) and is used to filter cooking fluid, e.g., shortening, which is used in the deep fryer. Filter tub assembly 2 comprises tub 4 having a front wall 6, back wall 8, first side wall 10, second side wall 12, and bottom 14. Wheels 16 are preferably attached to tub 4 to ease removal of tub 4 from beneath the deep fryer. In the illustrated embodiment, wheels 16 are shown attached to the walls of tub 4, however, it is to be appreciated that wheels 16 may be attached elsewhere, for example, to bottom 14. Handle 18 is secured to and extends upwardly from front wall 6. Handle 18 and wheels 16 are provided to ease transport of tub 4. Drain 13 is provided in wall 10 to allow fluid to be drained from tub 4.

Figure 2:
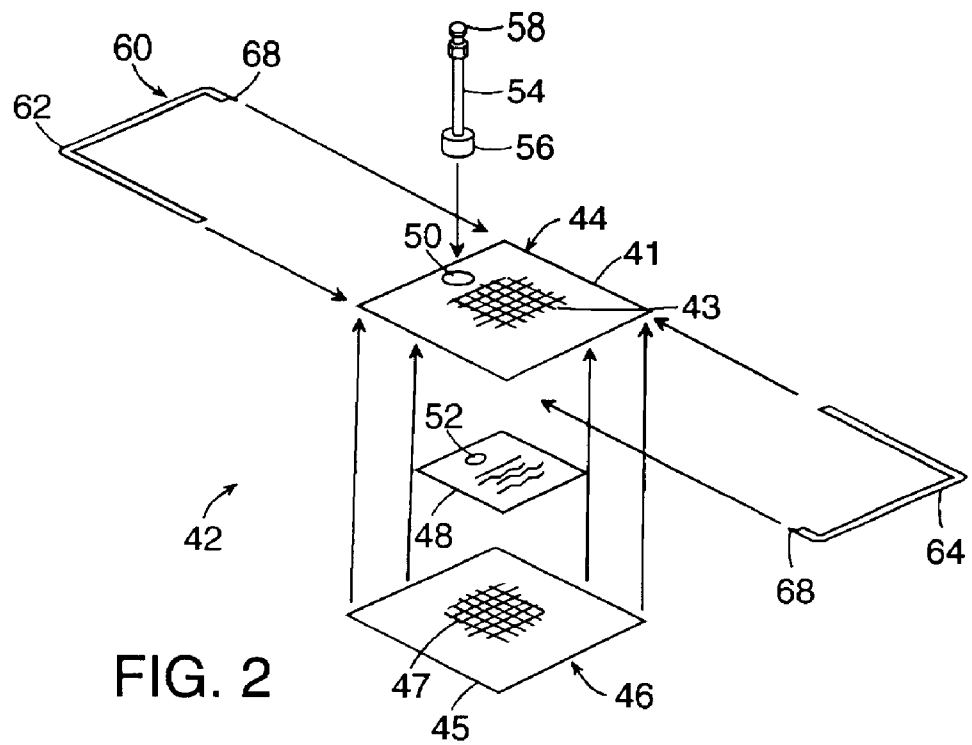
FIG. 2 is a schematic perspective view, shown in exploded form, of a filter screen assembly of the filter tub assembly of FIG. 1.

Pan 20 is nested in tub 4. Pan 20 has a front wall 22, back wall 24, first side wall 26, second side wall 28, and bottom 30. Bottom 30 is preferably sloped downwardly from front wall 22 toward back wall 24. A plurality of slots 32 are formed in bottom 30, proximate back wall 24. A plurality of apertures 34 are formed in back wall 24. Slots 32 and apertures 34 allow shortening to flow from pan 20 into tub 4. In another preferred embodiment the rear portion of bottom 30, proximate back wall 24, could be formed of a mesh or screen material (not shown) which would also allow shortening to pass through pan 20 to tub 4. It is to be appreciated that any combination of slots or apertures will be suitable to perform the function of allowing shortening to pass through pan 20 to tub 4. It is important, however, that the slots and apertures be positioned within pan 20, and that pan 20 be positioned within tub 4, such that the shortening passing from pan 20 to tub 4 does not fall directly onto filter screen assembly 42 (described in greater detail below with respect to FIG. 2). This diversion of the shortening prevents disruption of the cake of filter powder which normally forms on filter screen assembly 42 and which provides additional filtering for the shortening.

Shoulder 36 extends outwardly from the upper edge of pan 20. Shoulder 36 rests on the upper edges of tub 4 when pan 20 is nested in tub 4. Cover 37 is placed on tub 4 and extends from front wall 6 rearward to a point proximate front wall 22 of pan 20 when pan 20 is nested in tub 4. Stop pin 39 extends inwardly from side wall 12. Back wall 24 of pan 20 engages stop pin 39 when pan 20 is nested in tub 4, allowing proper positioning of pan 20 within tub 4.

A filter pan or crumb catcher 38 is nested in pan 20. Crumb catcher 38 has a perforated surface and, therefore, acts as a filter which allows shortening to pass through, but provides filtering for large food particles which have accumulated in the vat of the deep fryer. The perforated holes in filter pan 38 are preferably on the order of ¼ inch in diameter. Shoulder 40 extends outwardly from the upper edge of crumb catcher 38. Shoulder 40 rests on the upper edges of pan 20 when crumb catcher 38 is nested in pan 20.

A filter 35 sits on the bottom of pan 20 beneath filter pan 38 to provide a second level filtering of the shortening as it passes through pan 20. In certain preferred embodiments, filter 35 is a metal screen. In other preferred embodiments, filter 35 may be formed of filter paper. The mesh size of filter 35 is preferably on the order of 70 microns.

Filter screen assembly 42 is located in tub 4, resting, in certain preferred embodiments, on floor 14. Filter screen assembly 42 may be secured to floor 14 by hold down bars (not shown). Filter screen assembly 42 is shown in greater detail in FIGS. 2, 3. Filter screen assembly 42 comprises first filter screen 44 and second filter screen 46 with a baffle or baffle plate 48 positioned therebetween. First filter screen 44 comprises a frame portion 41 surrounding a mesh portion 43. Second filter screen 46 comprises a frame portion 45 surrounding a mesh portion 47. Mesh portions 43, 47 preferably have a mesh size on the order of approximately 50 microns. Baffle plate 48 is preferably a metallic plate having a plurality of slits, with the area between the slits being alternately raised and lowered to provide passageways for shortening to flow through. Baffle plate 48 is positioned between filter screens 44, 46, supporting and maintaining separation between the filter screens and allowing shortening to flow to fitting 52 which is secured to baffle plate 48. In certain preferred embodiments, fitting 52 is externally threaded. Aperture 50 is formed in first filter screen 44. Stand pipe 54 has a fitting 56 secured to a lower end thereof. Fitting 56 is preferably internally threaded to mate with and engage fitting 52. Stand pipe 54 passes through aperture 50 such that fitting 56 and fitting 52 can be secured to one another. Fitting 58 is secured to an upper end of stand pipe 54 for connection to a hose or other outlet device to which the shortening is delivered from tub 4 during filtering. A preferred embodiment of filter screen assembly 42 is disclosed in U.S. Pat. No. 5,870,945, the contents of which are incorporated herein by reference.

Figure 3:
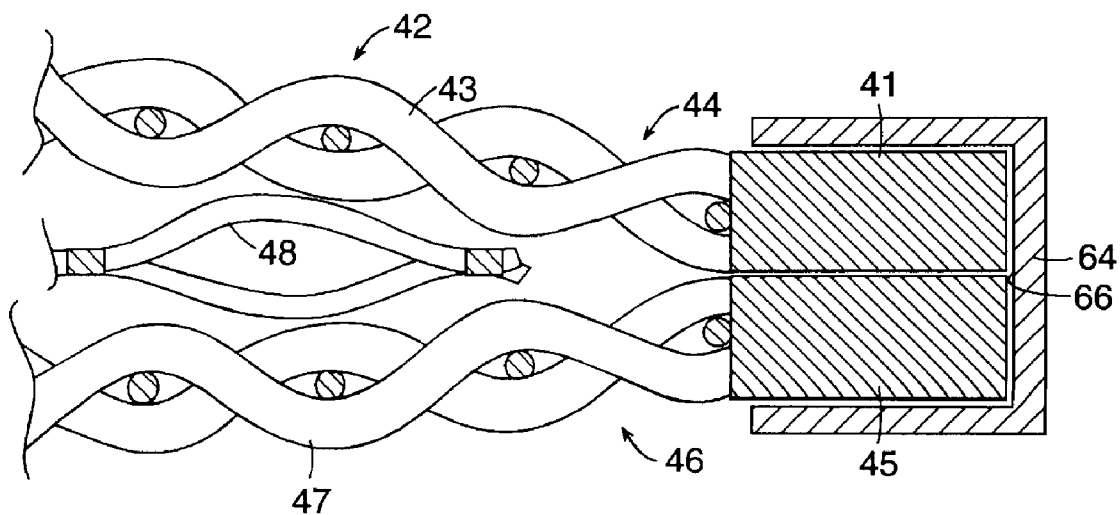
FIG. 3 is a schematic section view of a pair of filter screens of the filter screen assembly of FIG. 1 contained within a channel of a frame of the filter screen assembly.

Frame 60 comprises first portion 62 and second portion 64, each of which has an inwardly opening channel 66 formed therein as seen in FIG. 3. Each of first and second portions 62, 64 is substantially C-shaped to form a complementary portion of a rectangle such that when frame 60 is assembled, an entire rectangle is formed. It is to be appreciated that, in other preferred embodiments, first and second portions 62, 64 could be complementary portions of other shapes. Pins 68 are formed on each of first and second portions 62, 64 and are received in channel 66 of the other of first and second portions 62, 64 when frame 60 is assembled.

In use, shortening is drained from the deep fryer vat into crumb catcher 38, where large food particles are filtered by the perforated surface of crumb catcher 38. The shortening then falls through to pan 20 and flows downwardly along its bottom 30, through slots 32 and apertures 34 to tub 4 below. The shortening is then sucked through filter screen assembly 42 and out through stand pipe 54. As noted above, pan 20 is positioned above and overlies filter screen assembly 42, and slots 32 and apertures 34 are oriented in pan 20, such that shortening does not drop from pan 20 directly onto filter screen assembly 42. This advantageously prevents disruption of the filter cake which forms on filter screen assembly 42 during use. The filter cake provides additional filtering for the shortening on the order of approximately 20 microns.

Diverting the flow of shortening along pan 20 advantageously provides additional surface area for retaining food particles as the shortening passes to tub 4, and provides for additional cooling of the shortening.

In light of the foregoing disclosure of the invention and description of the preferred embodiments, those skilled in this area of technology will readily understand that various modifications and adaptations can be made without departing from the true scope and spirit of the invention. All such modifications and adaptations are intended to be covered by the following claims.

What is claimed is:

1. A filter for a fryer system comprising, in combination:
   a tub;
   a filter screen assembly configured to form a filter cake as a cooking fluid passes therethrough and positioned in the tub; and
   a pan positioned in the tub above the filter screen assembly, and the pan having sidewalls, a front wall, a back wall and a bottom and a plurality of outlet ports, and the plurality of outlet ports being disposed in at least the backwall or the bottom of the pan which extends laterally beyond outer edges of the filter screen assembly, thereby allowing the cooking fluid to flow through the plurality of outlet ports from the pan only beyond an outer edge of the filter screen assembly to substantially prevent the flow of the cooking fluid from the pan directly onto the filter screen assembly.

2. A filter for a fryer system according to claim 1, further comprising a filter pan having perforations in a lower surface thereof sized to filter particles of a selected size, the filter pan positioned in the tub above the pan.

3. A filter for a fryer system according to claim 2, further comprising a filtering element positioned in the pan beneath the filter pan.

4. A filter for a fryer system according to claim 3, wherein the filtering element comprises a screen.

5. A filter for a fryer system according to claim 3, wherein the filtering element comprises filter paper.

6. A filter for a fryer system according to claim 2, wherein the filter pan has a shoulder extending outwardly from an upper edge thereof, the shoulder resting on an upper edge of the pan to suspend the filter pan within the pan.

7. A filter for a fryer system according to claim 1, wherein the filter screen assembly comprises:
   a first filter screen;
   a second filter screen;
   a baffle positioned between the first and second filter screens; and
   a frame capturing the first filter screen, the second filter screen and the baffle.

8. A filter for a fryer system according to claim 7, further comprising an aperture in the first filter screen, a fitting secured to the baffle, and a conduit extending through the aperture and secured to the fitting.

9. A filter for a fryer system according to claim 7, wherein the frame comprises a first portion and a second portion, each of the first and second portions having an inwardly opening channel to receive outer edges of the first filter screen and the second filter screen.

10. A filter for a fryer system according to claim 1, wherein the bottom of the pan slopes downwardly from one side thereof to an opposite side.

11. A filter for a fryer system according to claim 1, wherein the bottom of the pan extends laterally beyond the outer edges of the filter screen assembly and has a plurality of apertures proximate the backwall of the pan, the apertures forming the plurality of outlet ports oriented such that the cooking fluid flowing through the apertures passes to the tub at a location beyond the outer edges of the filter screen assembly.

12. A filter for a fryer system according to claim 1, wherein the backwall of the pan extends laterally beyond the outer edges of the filter screen assembly, and the backwall has a plurality of apertures forming the plurality of outlet ports extending therethrough.

13. A filter for a fryer system according to claim 1, further comprising a cover extending across a portion of the tub.

14. A filter for a fryer system according to claim 1, wherein the pan has a shoulder extending outwardly from an upper edge thereof, the shoulder resting on an upper edge of the tub to suspend the pan within the tub.

15. A filter for a fryer system comprising, in combination;
   a tub;
   a filter screen assembly positioned in the tub;
   a pan positioned in the tub above the filter screen assembly, the pan having a bottom sloping downwardly from a front wall to a back wall thereof and a plurality of apertures in the bottom proximate the back wall, each of the apertures being oriented such that a cooking fluid flowing through the apertures passes to the tub at a location beyond outer edges of the filter screen assembly;
   a filter pan having perforations on a lower surface thereof sized to filter particles of a selected size, the filter pan being supported in the tub above the pan; and
   a screen positioned in the pan beneath the filter pan.

16. A filter for a fryer system in accordance with claim 15, further comprising a plurality of apertures formed in the back wall of the pan.

17. A filter for a fryer which is to be positioned above a filter screen assembly in the fryer comprising, in combination:
   a pan having a front wall, a back wall, a pair of side walls, and a bottom, the bottom sloping downwardly from the front wall to the back wall; and
   a plurality of apertures formed in the bottom, the apertures oriented such that a cooking fluid flowing through the apertures falls beyond outer edges of a filter screen assembly that is configured to form a filter cake as a cooking fluid flows therethrough and is positioned below the pan.

18. A filter in accordance with claim 17, further comprising a plurality of apertures formed in the back wall of the pan.

19. A filter in accordance with claim 17, further comprising a screen positioned in the pan and a perforated filter pan positioned in the pan above the screen.

\* \* \* \* \*